United States Patent
Hofmann

Patent Number: 5,867,781
Date of Patent: Feb. 2, 1999

[54] MOBILE RADIOTELEPHONE SYSTEM AND BROADCAST STATION

[75] Inventor: Ludwig Hofmann, Ilmmuenster, Germany

[73] Assignee: Siemens Aktiengesellschaft, Munich, Germany

[21] Appl. No.: 626,569

[22] Filed: Apr. 2, 1996

[30] Foreign Application Priority Data

Apr. 21, 1995 [DE] Germany .................. 195 14 716.2

[51] Int. Cl.[6] .................................................. H04Q 7/20
[52] U.S. Cl. .......................................... 455/419; 455/418
[58] Field of Search .................... 455/418, 419, 455/420, 422, 550, 450, 452

[56] References Cited

U.S. PATENT DOCUMENTS

| | | | |
|---|---|---|---|
| 5,109,403 | 4/1992 | Sutphin | 455/419 |
| 5,297,191 | 3/1994 | Gerszberg | 455/419 |
| 5,471,518 | 11/1995 | Barber et al. | 455/418 |
| 5,495,518 | 2/1996 | Hayashi | 455/418 |

OTHER PUBLICATIONS

Siemens D900 Mobilfunksystem pp. 2–19.
Siemens—D900/D1800 Digital Mobile Communication.

*Primary Examiner*—Dwayne D. Bost
*Assistant Examiner*—Myron K. Wyche
*Attorney, Agent, or Firm*—Hill & Simpson

[57] ABSTRACT

A mobile radiotelephone system has a service station in radio contact with, and exchanges digital data with, at least one mobile broadcast station via intermediately connected switching units. For controlling data communication, the mobile broadcast station contains a microprocessor that accesses a first memory area in which is stored a control program to be processed by the microprocessor. In a second memory area, a loading control program is stored, which is accessed by the microprocessor in dependence on a loading command. During processing, data of a new control program are transmitted from the service station and are stored in a third memory area. After the storing of the new control program, for the controlling of the data communication between the service station and the broadcast station the new control program is processed in place of the previous control program. With the system, it becomes possible to modify or exchange the control program of a broadcast station.

3 Claims, 3 Drawing Sheets

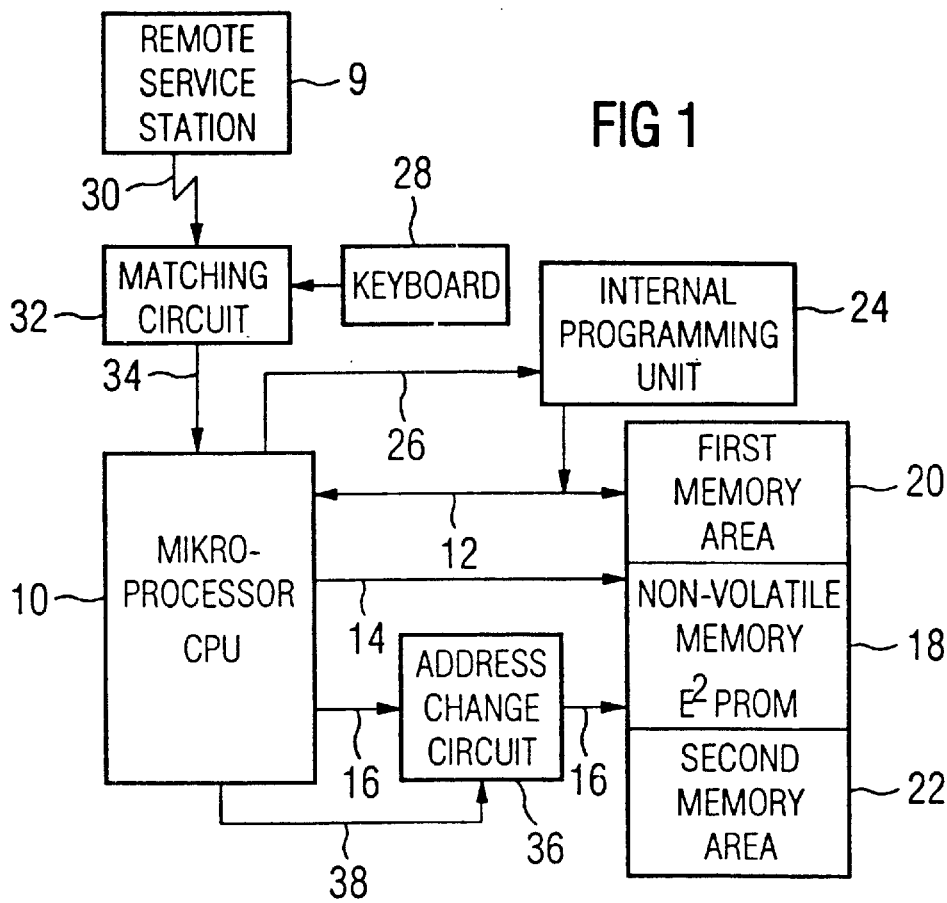
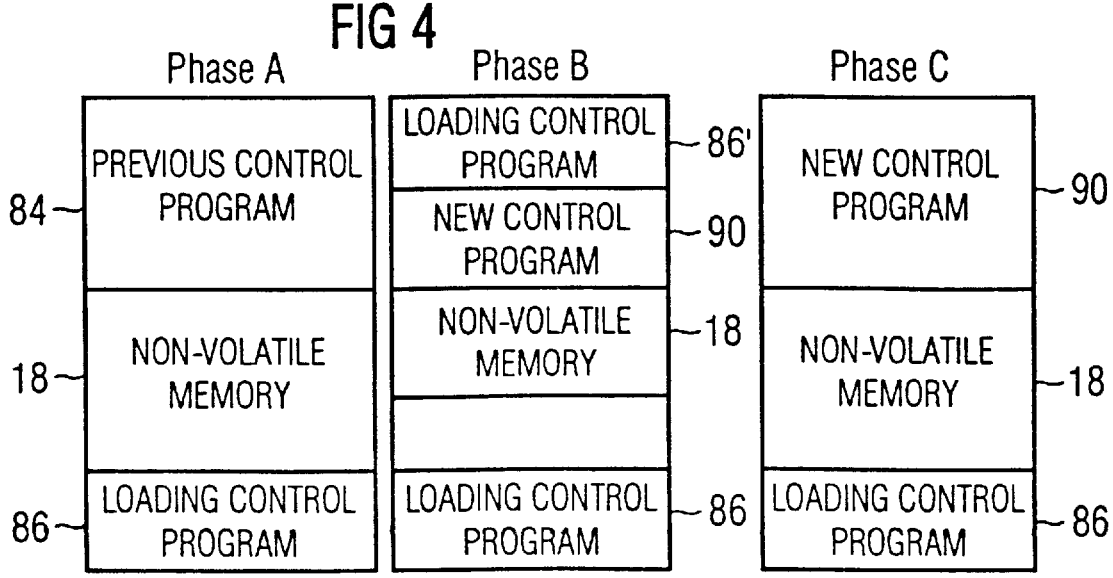

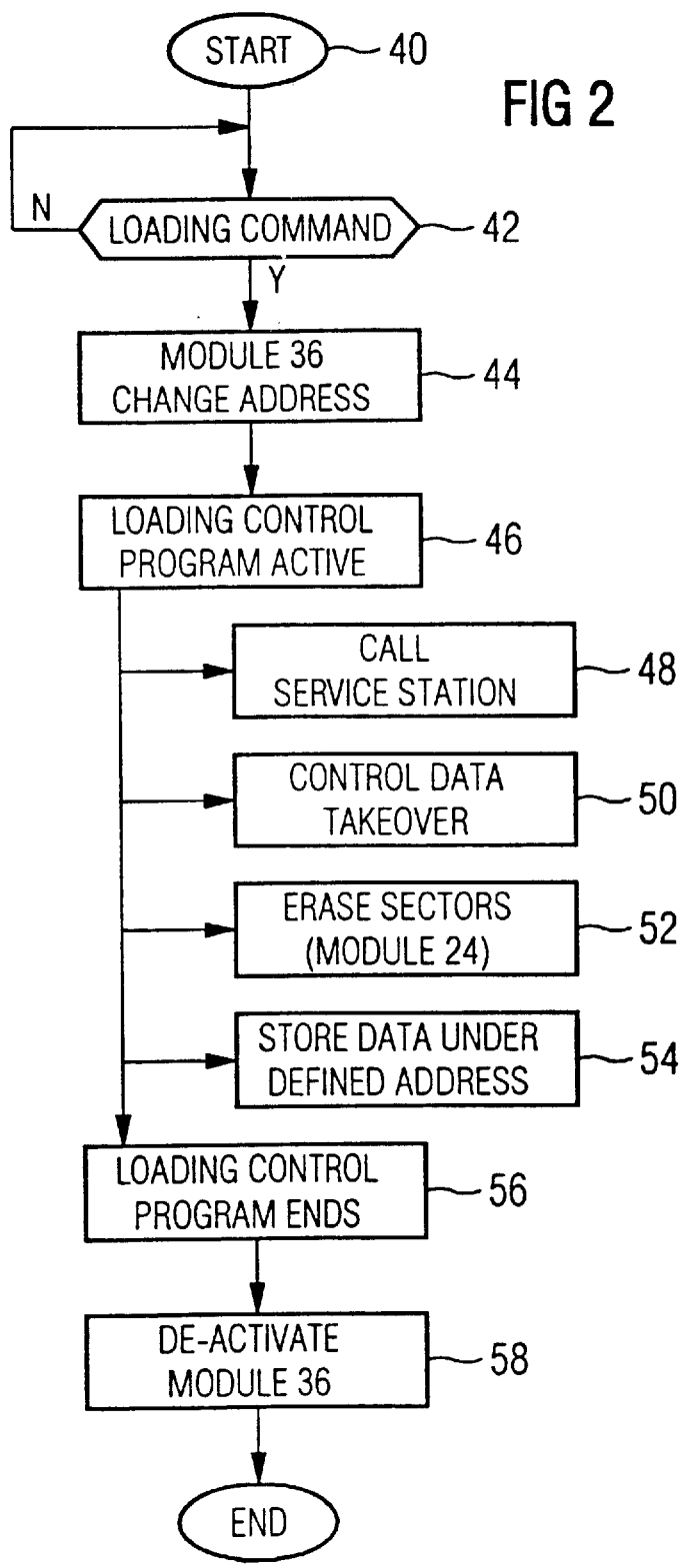

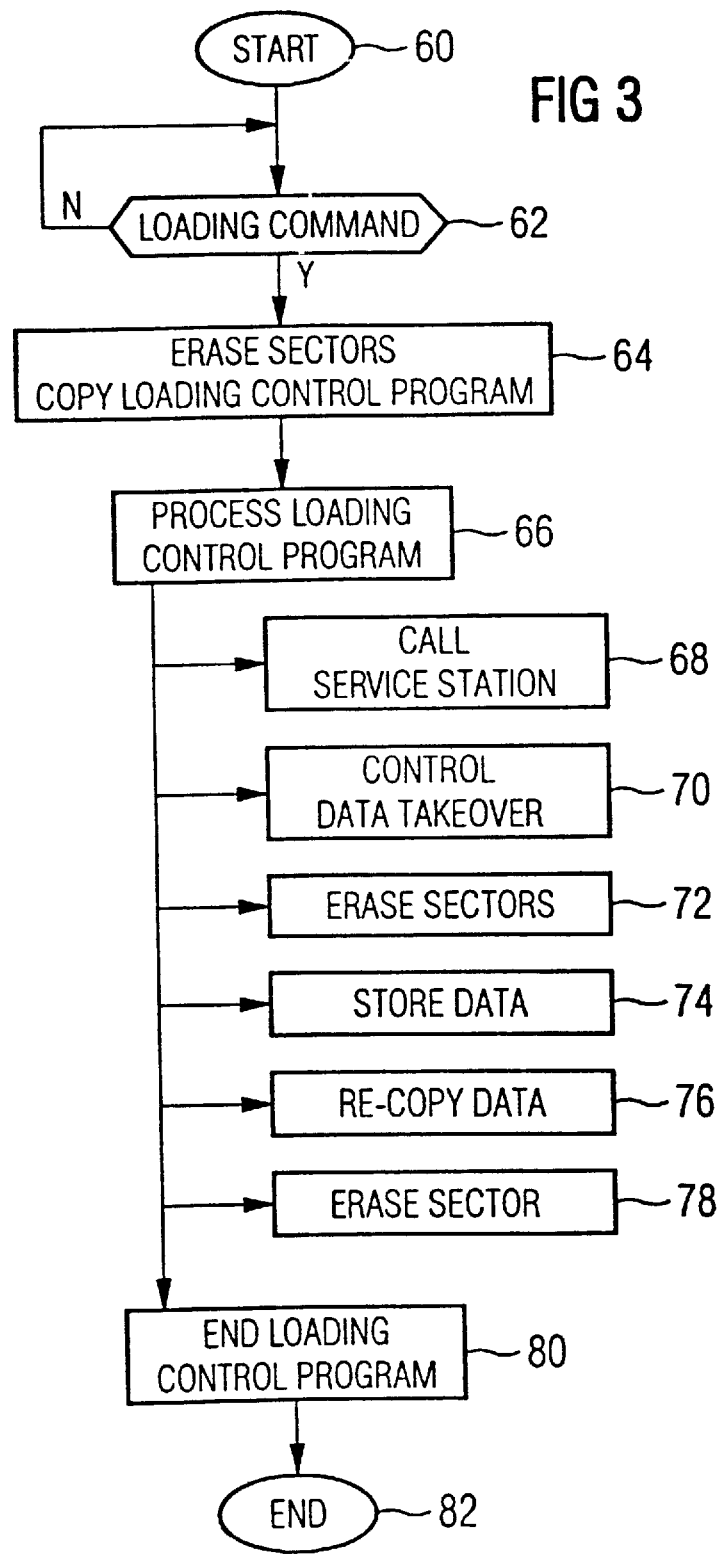

MOBILE RADIOTELEPHONE SYSTEM AND BROADCAST STATION

BACKGROUND OF THE INVENTION

The invention concerns a mobile radiotelephone system having a service station which is in radio contact with, and exchanges digital data with, at least one mobile broadcast station via intermediately connected switching units. The mobile broadcast station contains a microprocessor for controlling the data communication. The microprocessor accesses a first memory segment in which a control program to be processed by the microprocessor is stored. The invention further concerns a mobile broadcast station, as well as a method for the operation of the mobile radiotelephone system.

A known mobile radiotelephone system is the digital cellular mobile radiotelephone system D900 by Siemens, described in a brochure, "Siemens D900 mobile radiotelephone system," 1994, published by the Business Division for Mobile Radiotelephone Networks, Hoffmannstraße 51, D-81539 Munich, Siemens Aktiengesellschaft. A mobile radiotelephone system of this type has a central service station which exchanges digital data with a mobile telephone via intermediately connected switching units, for example base stations for the coverage of cell-type spaces in the radiotelephone network. Further digitally operated terminal devices may be connected to the mobile telephone, such as telefax devices. The control of the data communication at the mobile telephone is handled by a microprocessor, e.g. the control of the receiving unit, the signaling unit and the transmission unit, as well as of peripheral components such as the keyboard and the display unit of the mobile telephone. The microprocessor receives its control commands from a control program stored in a read-only memory. The read-only memory, e.g. a ROM or an EPROM, is plugged or soldered onto a circuit board of the mobile telephone as a component. Another possibility is that the read-only memory can be programmed from the outside by means of an external programming unit to which the mobile telephone is connected via an interface module.

In the course of the continuing development of mobile radiotelephone technology, there arise new control programs that are more efficient, or in which flaws that appeared in previous control programs have been eliminated. In order to be able to use new control programs, the mobile telephones normally have to be taken to a service station, and the read-only memories have to be loaded with the data of the new control program, or the read-only modules have to be exchanged. A procedure of this type is complicated and leads to a high technological and economic expense.

SUMMARY OF THE INVENTION

An object of invention is to provide a mobile radiotelephone system, a method for the operation of a mobile radiotelephone system, or a mobile broadcast station that makes available a new control program for the microprocessor of the mobile radiotelephone device in a simple way with a low hardware expense.

This object is achieved for a mobile radiotelephone system of the type described above in that a loading control program is stored in a second memory area. The microprocessor accesses the loading control program in dependence on a loading command. During the processing of the loading control program, the microprocessor contains data of a new control program from the service station and stores the data in a third memory area. After the storing of the new control program for controlling the data communication between the service station and the broadcast station, the microprocessor accesses the new control program in place of the previous or original one, and processes the new one.

The invention is based on the consideration that the hardware components already present in a mobile broadcast station can be used to take over data of a new control program in the context of a communication of data. According to the invention, a loading control program, which can be accessed by the microprocessor, is stored in the mobile broadcast station. For controlling the access, a loading command is generated that causes the microprocessor to process the loading control program. This loading control program contains commands upon execution of which the microprocessor communicates with the central service station and automatically takes over and stores the data of the new control program. No intervention in the broadcast station is required. The loading control program is made so that after it has been processed completely, the microprocessor accesses the newly loaded control program during operation of the mobile broadcast station. The invention thus makes it possible to equip mobile broadcast stations with a new control program without having to bring these stations to a service station. Moreover, the reprogramming of the read-only memory or the replacement of the read-only memory module is no longer necessary. Since hardware components that are already present can be used in the invention, the implementation of the invention has a low technological expense.

The initiative for the generation of the loading command can be taken at the mobile telephone or at the service station. The mobile radiotelephone system according to the invention can thus be used in flexible fashion. In case of system-conditioned changes to the mobile radiotelephone network, all the broadcast stations connected to the mobile radiotelephone network can be centrally equipped with new control programs from the service station. Another possibility is that the owner of the broadcast station desires the renovation of his control program, e.g. in order to use additional functions of the mobile radiotelephone network. In such a case, the owner can initiate the loading of the new control program and the data exchange with the service station by inputting a code.

The storing of the data of the previous control program, of the new control program and of the loading control program can occur in different areas of one or more memories. The first and the third memory area can coincide if a common memory is used, since after loading the new control program the previous control program is no longer needed and can be overwritten. The corresponding first memory area is then available for the new control program.

In a preferred exemplary embodiment, the broadcast station contains a non-volatile memory, preferably an $E^2$PROM or a flash PROM, as well as a means by which the non-volatile memory is at least sectorwise electrically erasable and can be newly written to, whereby the non-volatile memory contains the first, the second and/or the third memory area. The combination of all the memory areas in one single non-volatile memory leads to a simple technological solution. The means for the sectorwise erasing of the non-volatile memory is arranged inside the broadcast station. Although this does increase the technological expense slightly, the advantages of the simple reprogramming of the control program nonetheless outweigh this.

The invention further concerns a mobile broadcast station. This broadcast station can exchange digital data with a service station by radio. It contains a microprocessor that accesses a first memory area in which is stored a control program to be processed by the microprocessor. The mobile broadcast station is characterized in that a loading control program is stored in a second memory area, and the microprocessor accesses the loading control program in dependence on a loading command. During the processing of the loading command the microprocessor receives data of a new control program from the service station and stores these data in a third memory area. After the storing of the new control program for controlling the data communication between the service station and the broadcast station, the microprocessor accesses the new control program and processes it.

In the mobile broadcast station according to the invention, the control program can easily be exchanged for another one, whereby the hardware components that are already present can be used for data communication with the service station.

Exemplary embodiments of the invention are indicated below on the basis of the drawings.

BRIEF DESCRIPTION OF THE DRAWINGS

FIG. 1 shows essential components for the realization of the invention, in a block diagram, FIG. 2 is a flow chart showing sequence control steps according to a first exemplary embodiment, FIG. 3 is a flow chart showing sequence control steps according to a second exemplary embodiment, and FIG. 4 illustrates the contents of a non-volatile memory at different phases in the processing of the loading control program.

DESCRIPTION OF THE PREFERRED EMBODIMENTS

FIG. 1 shows a block diagram of essential hardware components of a mobile telephone also called herein a mobile broadcast station, used in the realization of the invention. A microprocessor 10 is connected via a data bus 12, a control bus 14, and an address bus 16 with a non-volatile memory 18, in which an original control program for controlling the microprocessor 10 is stored in a first memory area 20. During processing of the commands of the control program, the microprocessor 10 controls the transmission and receiving unit of the mobile telephone. The non-volatile memory 18 further contains a second memory area 22, in which a loading control program is stored, which is called up for data communication with a remote service station 9 for the transmission of data of a new control program. The non-volatile memory 18 can, for example, be an $E^2$PROM or a flash PROM.

An internal programming unit 24 is connected to the data bus 12. With the programming unit individual sectors of the memory 18 are electrically erased and data can be newly written into the memory 18. As specified below, these data are command data of a new control program or are command data of the loading control program, which is copied over in the memory 18. The programming unit 24 is controlled via a control circuit 26 by the microprocessor 10. Via a data input circuit 34, the microprocessor 10 receives a coded signal prepared by a matching circuit 32. The coded signal is received by the service station via a broadcast link, indicated by the arrow 30, or is input at the mobile telephone via a keyboard 28. The microprocessor 10 generates a loading command from the coded signal, which command triggers the loading of a new control program.

A freely programmable address change circuit 36 is connected to the address bus 16. This circuit is controlled by the microprocessor 10 via a control circuit 38. The address change circuit 36 can change the addresses coming in to the address bus 16 in dependence on the signal on the control circuit 38. For example, it can change the initial address "H00" (H stands for hexadecimal notation), emitted for the memory 18 by the microprocessor 10 after a reset, to a value corresponding to the initial address of the loading control program in the second memory area 22.

The functioning of the exemplary embodiment shown in FIG. 1 is explained below on the basis of the flow chart according to FIG. 2. After the start (step 40), in step 42 it is determined whether a loading command in the form of a coded signal from the service station has been transmitted via radio or input via the keyboard 28. If the microprocessor 10 decodes such a loading command, it activates the address change circuit 36, which changes the addresses coming in to the address bus 16. The address change circuit 36 can, for example, be implemented as an adding module that adds a constant address to the output address. After resetting the microprocessor 10, for the processing of the control program the initial address of the memory 18 is normally outputted. The address change circuit 36 adds to this initial value (e.g. "H00") the address value under which the loading control program in the memory area 22 is stored. In the following step 26, the loading control program 46 is thus activated in place of the previous control program in the memory area 20, and the commands of the loading control program 46 are processed.

In step 48, the loading control program causes the service station to be called by the mobile telephone, and the loading of a new control program is requested. In the next step 50, the microprocessor 10 controls the taking over of data from the service station, whereby the data are intermediately stored in a volatile memory (RAM). In the following step 52, the programming unit 24 is controlled, which erases the sectors required for the new control program in the memory 18. Subsequently, in step 54 the transmitted data of the new control program are stored, beginning with a defined address, preferably the address "H00." The loading control program is now processed (step 56), and the address change circuit 36 is deactivated (step 58), so that the original addresses are switched through to the address bus 16.

If, after a renewed switching-on of the mobile telephone or after a resetting of the microprocessor 10, the memory 18 is accessed, the microprocessor control 10 begins to process the new control program stored under the initial address "H00." The mobile telephone now operates according to the technical functions defined by the new control program.

A further embodiment of the invention is specified below in the context of a sequence control according to the steps in FIG. 3. In this exemplary embodiment, the address change circuit 36 described above is not needed. After the start (step 60), the sequence control checks whether a loading command is present or not (step 62). If the loading of a new program is desired, in step 64 the programming unit 24 is activated, which erases sectors in the initial area of the non-volatile memory 18. Subsequently the loading control program, stored at a predetermined location of the memory 18, and preferably in the last memory segment, is loaded at the start of the memory 18 (step 64).

In the next step 66 the loading control program is processed. In the mobile radiotelephone system, for data transmission between the service station and the mobile broadcast station there must be a continuous radio contact so that it is ensured that the data are transmitted without problems. In the case of an interruption of radio contact, e.g. radio silence in shielded areas, the data transmission must be restarted. If the mobile telephone is reset by means of a reset signal, or is newly switched on, the microprocessor 10 processes the control program stored in the memory 18, beginning with the initial address "H00". Since according to the exemplary embodiment of the invention the loading control program is now stored under the initial address, the repetition of the data transmission after a possible interruption is ensured.

In the processing of the loading control program, in step 68 the central service station is called, and in the following step 70 the data takeover is started. The data of the new control program are, for example, stored intermediately in the working memory of the microprocessor 10. In step 72, predetermined sectors of the memory 18 are erased in order to store the new control program in these sectors (step 74). After this, in step 76 the data of the new control program are copied to the start of the memory 18 and the sectors in which the data of the new control program were intermediately stored are erased (step 78). During the copying of the data (step 76), the loading control program in the initial area of the memory 18 is overwritten. In order nonetheless to be able to process commands of the loading control program, these commands are intermediately stored in the working memory (RAM) of the microprocessor 10.

FIG. 4 shows the content of the memory 18 at different phases in the loading of the new control program according to the sequence control in FIG. 3. Before the appearance of a loading command, the previous control program 84 is stored in the initial area of the memory 18. The loading control program 86 is located in the last sector of the memory 18. Of course, the loading control program 86 can also be stored at a different predetermined location of the memory 18. After the appearance of the loading command (phase B), the loading control program 86 is copied to the start of the memory 18 as loading control program 86'. The data for the new control program 90 are written to a predetermined sector of the memory 18 and intermediately stored there. In the concluding phase C, the initial area of the memory 18 is erased and the data of the new control program 90 are moved to the start of the memory 18. During restarting of the microprocessor 10, the new control program 90 is now processed through accessing of the initial address of the memory 18.

With the processing of the loading control program (step 80) in FIG. 3, the sequence control for loading a new control program is ended (step 82). After resetting the microprocessor 10, or after switching on the mobile telephone, the new control program 90 is processed, beginning with the initial address of the memory 18.

The specified exemplary embodiments of the invention can be modified in many ways in practice. Thus, the data transmission for the data of the new control program can be repeated several times in order to improve the data reliability. Another variation is that, after calling the service station (steps 48 and 68), the mobile telephone waits for the service station to call back, where a data processing apparatus makes the data available and transmits them as a control.

As an intermediate memory for the data of the new control program, a battery-buffered volatile memory (RAM) can alternatively be used. A ferro-RAM or a mirror RAM are also possibilities as a memory for the new control program.

The memory 18 must be enlarged according to the data size of the new memory program. Since an additional memory area for the intermediate storage of the new control program is needed only in phase B (cf. FIG. 4), this memory segment can be used for other functions in the normal operation of the mobile telephone, e.g. for speech storage functions, for the temporary storage of data, or as a memory area for an answering machine.

As further variations of the exemplary embodiment, during the transmission of data for the new control program, device-specific data can also be transmitted, for example the serial number, the model number or the so-called IMEI (International Mobile Equipment Identity). By means of such data, from the service station e.g. stolen units can be disabled, device-specific software can be loaded, additional functions for the mobile broadcast station can be enabled or disabled as the customer desires, the add-on list of broadcast stations supplied can easily be kept current, and statistics concerning required functions for the user can be created as a user profile. It is further possible to transmit feature signals during the transmission of data for the new control program, which trigger device functions that were previously programmed in. As further data, data concerning the run-time of the device, statistical data concerning the frequency of use of the broadcast station, data concerning the mobile behavior of the broadcast station (e.g. hand-over statistics), data concerning the battery status of the broadcast station, etc., can be determined and transmitted to the service station.

As mentioned, the initiative for starting the transmission of the data for the new control program can come from the broadcast station. The broadcast station thereby calls the service station, and the service station immediately transmits the data for the new control program. In this case of operation, the utilization of the capacity of the data processing equipment in the service station is unfavorable, since the access by many broadcast stations is temporally arbitrarily distributed. Another operational mode is that after the call from the broadcast station, the service station takes the initiative for starting the data transmission and itself calls back, whereby the subscriber number IMSI (International Mobile Subscriber Identity) of the broadcast station is also transmitted. This operational mode allows an improvement of the utilization of the capacities of the service station.

Although various minor changes and modifications might be proposed by those skilled in the art, it will be understood that my wish is to include within the claims of the patent warranted hereon all such changes and modifications as reasonably come within my contribution to the art.

I claim as my invention:

1. A mobile radio telephone system, comprising:
   a service station for providing radio contact with at least one mobile broadcast station via intermediately connected switching units, and which exchanges digital data with said mobile station;
   the mobile broadcast station containing a microprocessor for controlling data communication, the microprocessor accessing a first memory area in which an original control program to be processed by the microprocessor is stored;
   a loading control program stored in a second memory area;
   the microprocessor accessing the loading control program in dependence on a loading command;
   the microprocessor receiving data of a new control program during the processing of the loading control program from the service station and storing the new control program data in a third memory area;
   the microprocessor accessing the new control program and processing the new control program in place of the original control program after the storing of the new control program for controlling the data communication between the service station and the mobile broadcast station;

the broadcast station contains a non-volatile memory and a unit for at least sector wise electrical erasing of the non-volatile memory;

the non-volatile memory containing all of the first, second, and third memory areas; and the microprocessor, after appearance of the loading command, copying the loading control program to a start of the non-volatile memory.

2. The mobile radiotelephone system according to claim 1 wherein the microprocessor, towards an end of the processing of the loading control program, copies it into a predetermined area of the non-volatile memory and then copies the new control program to said start of the non-volatile memory.

3. A mobile radio telephone system, comprising:

a service station for providing radio contact with at least one mobile broadcast station via intermediately connected switching units, and which exchanges digital data with said mobile station;

the mobile broadcast station containing a microprocessor for controlling data communication, the microprocessor accessing a first memory area in which an original control program to be processed by the microprocessor is stored;

a loading control program stored in a second memory area;

the microprocessor accessing the loading control program in dependence on a loading command;

the microprocessor receiving data of a new control program during the processing of the loading control program from the service station and storing the new control program data in a third memory area;

the microprocessor accessing the new control program and processing the new control program in place of the original control program after the storing of the new control program for controlling the data communication between the service station and the mobile broadcast station;

the broadcast station containing a non-volatile memory and a unit for at least sector wise electrical erasing of the non-volatile memory;

the non-volatile memory containing all of the first, second, and third memory areas; and the non-volatile memory and the microprocessor being connected via an address bus, a logic module for changing addresses on the address bus, the microprocessor controlling the logic module after appearance of the loading command so that the addresses on the address bus are changed to an address value under which the loading control program is stored, and the microprocessor deactivating the logic module after the processing of the loading control program in order not to change the addresses on the address bus.

* * * * *